Dec. 29, 1936.    B. F. WILLIAMS    2,065,637
VALVE
Filed March 28, 1933
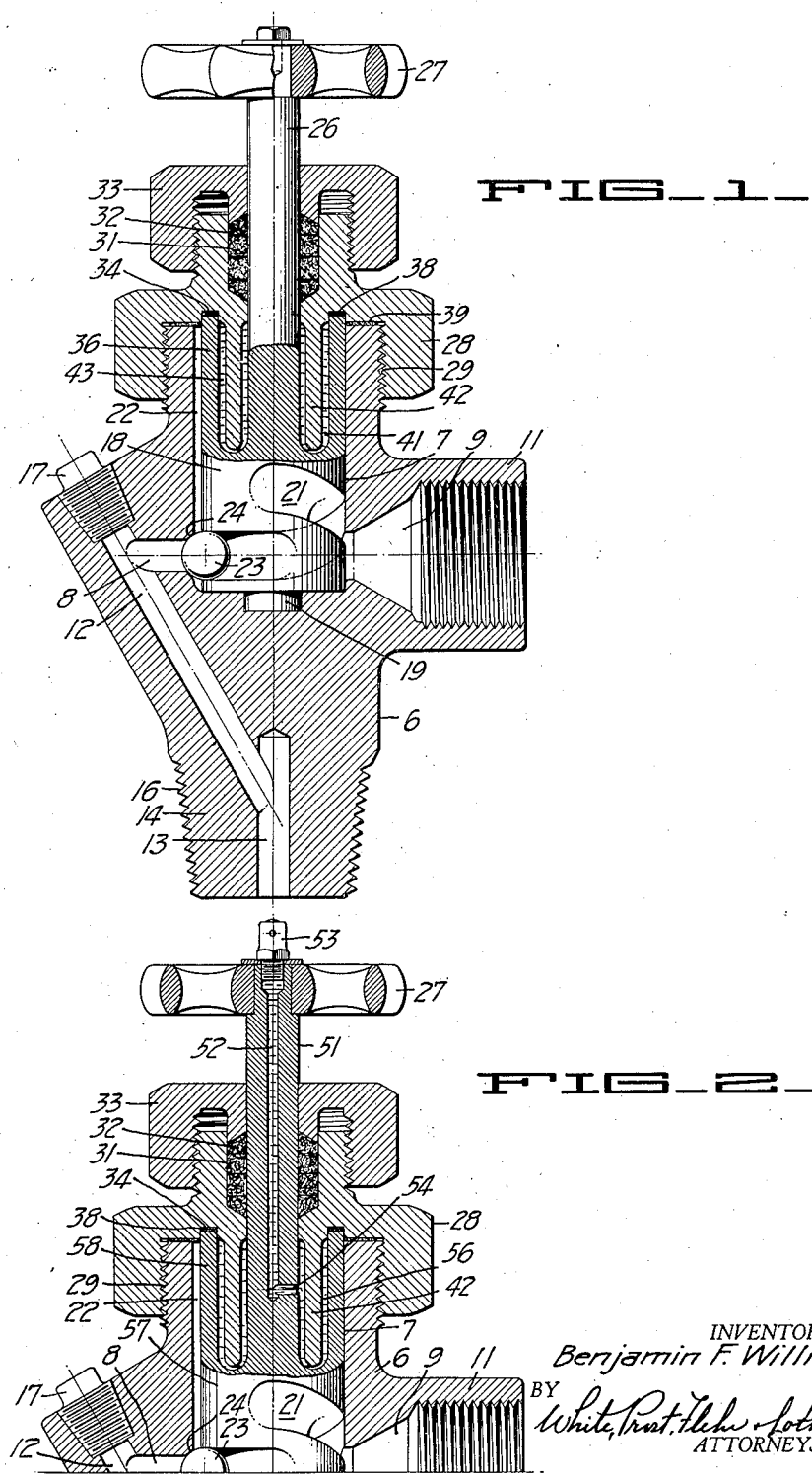
INVENTOR.
Benjamin F. Williams
BY
White, Prost, Kehr Lothrop
ATTORNEYS.

Patented Dec. 29, 1936

2,065,637

UNITED STATES PATENT OFFICE 2,065,637

VALVE

Benjamin F. Williams, San Francisco, Calif., assignor to Wil-Bro Corporation, San Francisco, Calif., a corporation of California Application March 28, 1933, Serial No. 663,105

8 Claims. (Cl. 251—40)

My invention relates to valves of the general type shown in my co-pending application entitled "Valve", filed October 31, 1932, with Serial No. 640,467, now Patent No. 2,011,601, granted August 20, 1935. The valve shown in the co-pending application includes a casing within which is a cylindrical rotor having a helical groove therein with a closure ball partially seated in the helical groove and partially seated in an axial groove in the casing, so that upon rotation of the rotor the ball is translated in the casing to cover and uncover a port in the casing.

In the present instance, it is an object of my invention to provide a sealing means for a valve of the character described.

Another object of my invention is to provide a valve which is gas-tight, particularly with light gases such as butane.

A further object of my invention is to provide a sealing means which does not increase the resistance to turning of the valve rotor.

An additional object of my invention is to provide a valve having a sealing means which is not dependent upon careful and accurate manufacture for its efficacy.

The foregoing and other objects are attained in the embodiment of the invention shown in the drawing, in which—

Figure 1 is a cross-section on a longitudinal plane of a valve constructed in accordance with my invention.

Figure 2 is a cross-section on a longitudinal plane of a portion of a valve in general similar to that shown in Figure 1 but with a packing replenishing means.

In its preferred form, the valve of my invention includes a casing having a rotor disposed therein, the rotor being provided with a stem projecting through a cap on the casing, together with a baffle on the cap which projects into a corresponding cavity in the rotor to provide a reservoir for the reception of a plastic packing material.

In the form of my invention shown in Figure 1, there is provided a valve casing 6 which preferably is a metal casting. The casing includes a circular-cylindrical recess 7 with which communicate an inlet port 8 and an outlet port 9. The outlet port terminates in an internally threaded boss 11 forming part of the casing 6 and adapted to be connected to a discharge conduit. The inlet port 8 communicates with a passage 12 preferably cored or drilled in the casing 6 and in turn opening into a duct 13 within an inlet boss 14 which is preferably externally threaded as at 16 for junction to a suitable conduit. The passage 12 is preferably closed at its outer end by a fusible plug 17, so that, in the event of excessive temperature or fire, gas which is normally confined upon closure of the valve is permitted to escape and burn rather than to explode.

Adapted to be disposed within the chamber 7 is a circular-cylindrical rotor 18 having an extension 19 at one end thereof for journalling the rotor in the casing 6, and likewise having a peripheral, helical groove 21 which in cross-section is preferably semi-circular or substantially semi-circular. Co-operating with the groove 21 is a groove 22 cut in the casing 6 and extending axially thereof to receive a ball 23. In one position the ball 23 is adapted to seat on a conical surface 24, providing a valve seat at the terminus of the duct 8, while in another position the ball 23 is axially translated along the groove 22 out of the seat 24 to permit free flow from the duct 8 through the chamber 7 into the outlet 9.

For operating the rotor 18, I preferably dispose a circular-cylindrical stem 26 on the rotor and locate the stem co-axially with the rotor. If desired, the stem can be integrally formed, as illustrated in Figure 1. At its upper end the stem carries a hand wheel 27, or other suitable actuating mechanism, and is partially located in a cap 28 which is internally threaded to engage threads 29 on the exterior of the body casing 6.

The stem is preferably packed in the customary fashion, and to this end the cap 28 is provided with a packing recess 31 within which is situated any suitable packing or stuffing 32 held in place by a gland 33 surrounding the stem 26 and threadedly engaging the cap 28 for suitable adjustment of the packing material 32.

In accordance with my invention, I provide additional means for packing the stem 26. The cap 28 is preferably formed with an annular groove 34 therein, adapted to receive a circular-cylindrical flange 36 which is co-axial with the stem 26 and stands up from the rotor 18. The flange 36 has preferably a relatively close fit within the groove 34, and axial movement of the rotor is restrained by the cap due to the interposition of a gasket 38 at the end of the flange 36 and within the groove 34. The thickness of the gasket 38 is such that, in conjunction with a gasket 39 interposed between the casing 6 and the cap 28, any desired amount of axial play may be afforded the rotor, or axial play can be virtually eliminated. The flange 36 is preferably spaced from the stem 26 in order to provide an annular cavity 41 in the rotor. Projecting into the cavity is a depending, annular baffle 42 preferably formed integrally with the cap 28 and disposed coaxially with and spaced from the stem 26 in order to provide a labyrinthine passage 43 between the flange 36, the baffle 42 and the stem 26.

In the passage 43 I dispose a plastic, fluid packing material, preferably a very viscous composition such as castor oil and graphite. Since the plastic material is disposed within a passage 43 which is virtually U-shaped in cross-section, the arrangement acts in the fashion of a U-tube or manometer, so that gas leaking along the rotor can cause a considerable displacement of the plastic material in the different legs of the U-shaped passage but, ordinarily, will not be sufficient to displace the packing material from the passage. Furthermore, the labyrinthine form of the passage provides many sharp turns and greatly throttled openings for any gas which might ordinarily tend to escape, in order to reduce the velocity and pressure of such gas. In practice I have found that virtually no leakage along the stem 26 occurs, even with gases such as butane, which normally are considered extremely difficult to retain.

In Figure 2 the structure is substantially identical with that of Figure 1, with the exception that the stem 51 is provided with a central bore 52 at its upper end terminating in a lubricant fitting 53 and at its lower end communicating with a cross passage 54 discharging into a cavity 56 formed in the rotor 57 between the stem 51 and a flange 58. With this arrangement, the plastic packing material contained in the cavity 56 can be renewed from time to time by connection of a suitable mechanism with the fitting 53, and is retained in place by automatic closure of the fitting 53 in accordance with usual practice.

I claim:

1. A valve comprising a casing having a passageway therethrough, a rotor in said casing for controlling the opening and closing of said passageway, a stem on said rotor, an annular wall on said rotor surrounding said stem and defining an annular cavity therebetween, a cap on said casing, said cap having a journal for said stem, and an annular baffle on said cap projecting into but substantially spaced from the walls of said cavity.

2. A valve comprising a casing having a passageway therethrough, a rotor in said casing for controlling the opening and closing of said passageway, said rotor having an annular cavity therein, a cap on said casing, means included in said cap acting as a journal for said rotor and an annular baffle on said cap projecting into but substantially spaced from the walls of said cavity.

3. A valve comprising a casing having a passageway therethrough, a rotor in said casing for controlling the opening and closing of said passageway, a cap on said casing, means on said cap for restraining axial and radial movement of said rotor, said rotor having an annular cavity therein, and an annular baffle on said cap depending into but substantially spaced from the walls of said cavity.

4. A valve comprising a casing having a passageway therethrough, a rotor in said casing for controlling the opening and closing of said passageway, and a cap on said casing for restraining axial movement of said rotor, said cap and said rotor being relatively rotatable and being mutually contoured and sufficiently spaced to provide a substantial labyrinthine passage of approximately uniform size therebetween.

5. A valve comprising a casing having a passageway therethrough; a rotor in said casing for controlling the opening and closing of said passageway; a stem on said rotor; a cap on said casing encompassing said stem; said rotor, said cap, and said stem being formed to provide a labyrinthine passage of substantially uniform width throughout its length, and a viscous sealing material in said passage.

6. A valve comprising a casing having a passageway therethrough and having a cylindrical bore therein, a cylindrical rotor in said bore for controlling the opening and closing of said passageway, a stem on said rotor, an annular flange on said rotor spaced from said stem to provide a cavity therebetween, a cap on said casing, said cap having a groove to receive said flange, a baffle on said cap projecting into but spaced from the walls of said cavity, and viscous sealing material in said cavity.

7. A valve comprising a casing having a passageway therethrough, a rotor in said casing for controlling the opening and closing of said passageway, a stem on said rotor, a cap on said casing, said cap having a bore therethrough one portion of which is of a diameter to form a bearing for said stem and a second portion of which is of larger diameter to form a passage between it and the stem, an annular wall on said rotor encompassing said second portion and spaced therefrom to form a continuation of said passage, and viscous sealing material in said passage.

8. A valve comprising a casing having a passageway therethrough, a rotor in said casing for controlling the opening and closing of said passageway, a stem on said rotor, a cap on said casing encompassing said stem, said rotor having an annular cavity therein, a baffle on said cap projecting into said cavity and spaced from the walls thereof, and viscous sealing material in said cavity.

BENJAMIN F. WILLIAMS.